United States Patent [19]

Mitra et al.

[11] Patent Number: 5,781,624
[45] Date of Patent: Jul. 14, 1998

[54] METHOD FOR SHARING NETWORK RESOURCES BY VIRTUAL PARTITIONING

[75] Inventors: Debasis Mitra, Summit, N.J.; Ilze Ziedins, Auckland, New Zealand

[73] Assignee: Lucent Technologies Inc., Murray Hill, N.J.

[21] Appl. No.: 649,502

[22] Filed: May 17, 1996

Related U.S. Application Data

[60] Provisional application No. 60/011,846 Feb. 16, 1996.
[51] Int. Cl.$^6$ .................................................. H04M 3/38
[52] U.S. Cl. ............................ 379/244; 379/220; 379/221; 379/243; 379/265; 379/266; 379/309
[58] Field of Search .................................. 379/242, 243, 379/244, 245, 246, 219, 220, 221, 222, 223, 202, 207, 111, 112, 113, 120, 137, 265, 266, 309

[56] References Cited

U.S. PATENT DOCUMENTS

| | | | |
|---|---|---|---|
| 4,979,118 | 12/1990 | Kheradpir | 379/221 |
| 4,991,204 | 2/1991 | Yamamoto et al. | 379/221 |
| 5,136,581 | 8/1992 | Muehrcke | 379/202 |
| 5,185,780 | 2/1993 | Leggett | 379/113 |
| 5,226,075 | 7/1993 | Funk et al. | 379/243 |
| 5,289,368 | 2/1994 | Jordan et al. | 379/113 |
| 5,325,426 | 6/1994 | Held | 379/243 |
| 5,347,511 | 9/1994 | Gun | 370/54 |
| 5,392,344 | 2/1995 | Ash et al. | 379/243 |
| 5,485,455 | 1/1996 | Dobbins et al. | 370/60 |
| 5,537,469 | 7/1996 | Beniston et al. | 379/243 |
| 5,548,639 | 8/1996 | Ogura et al. | 379/221 |

FOREIGN PATENT DOCUMENTS

A2 0398 037  4/1997  European Pat. Off. ........ H04L 12/56

OTHER PUBLICATIONS

"Exact Computation of Time and Call Blocking Probabilities in Multi-Traffic Circuit-Switched Networks", by van de Vlag, H. et al., *IEEE*, pp. 1b.3.1-1b.3.10 (1994).

"Multipath Routing", by Tannenbaum, A., *Computer Networks*, Prentice-Hall International, Inc. 2nd Ed., pp. 291-299 (1992).

I. S. Gopal et al., "Optimal Call Blocking Policies in an Integrated Services Environment," *Proceedings of the Conferences Information Sciences and Systems*, 383-388. John Hopkins University (1983).

B. Kraimeche et al., "Circuit Access Control Strategies in Integrated Digital Networks*," *IEEE*, 230-235 (1984).

G. R. Ash et al., "Real-Time Network Routing in a Dynamic Class-of-Service Network," *Teletraffic and Datatraffic*, ITC-13, 187-194 (1991).

M. I. Reiman, "Optimal Time Reservation For A Critically Loaded Link," *Teletraffic and Datatraffic*, ITC-13, 247-252 (1991).

A. Elwalid et al., "A New Approach for Allocating Buffers and Bandwidth to Heterogeneous,Regulated Traffice in an ATM Node," *IEEE Journal on Selected Areas in Communications*, vol. 13, No. 8, 1115-1127 (Aug. 1995).

*Primary Examiner*—Krista Zele
*Assistant Examiner*—Scott Wolinsky
*Attorney, Agent, or Firm*—Katharyn E. Olson; Martin I. Finston

[57] ABSTRACT

A method of operating a network by sharing resources associated with various classes among calls in the various classes according to a state dependent reservation parameter. Nominal amounts of one or more resources are allocated to each call class. When a call of a class of service operating in the network requires resources in excess of those allocated to the class, resources allocated to other classes of service are advantageously shared with the class of service. The sharing is based on a reservation parameter associated with the class of service of the call. The reservation parameter is advantageously a function of the network state. The role of the reservation parameter is to protect underloaded classes (i.e., those classes not using all of their allocated nominal capacity) from excessive borrowing by overloaded classes (i.e., classes using more than their allocated nominal capacity). More generally, the inventive method is used to determine if sufficient resources are available for routing calls and to route calls based on the determined available resources.

20 Claims, 4 Drawing Sheets

METHOD FOR SHARING NETWORK RESOURCES BY VIRTUAL PARTITIONING

REFERENCE TO RELATED APPLICATION

This application claims priority of Provisional application Ser. No. 60/011846 filed on Feb. 16, 1996.

TECHNICAL FIELD

The invention relates to the field of sharing resources in a network, as for example by sharing bandwidth between different classes of services on a communications link in a network.

BACKGROUND

Networks are a principal means of exchanging or transferring information (e.g., signals representing data, voice, text or video) among endpoints (e.g., devices for sending and/or receiving information such as computer terminals, multimedia workstations, fax machines, printers, servers, telephones) connected to the network. The exchange or transfer of information is often referred to as a "call" or "connection." A network comprises nodes connected to each other, and to endpoints, by links. Typically, each link is bi-directional, and thus information may be exchanged or transferred (i.e., the call may be carried) in forward and reverse directions. Each link is characterized by a bandwidth or link capacity in each direction. Information to be exchanged between two endpoints is conveyed over a path comprising a set of nodes and links connecting the two endpoints. Information in transit between endpoints may be temporarily stored in buffers at nodes along the path pending sufficient available bandwidth on links.

Networks are increasingly being used for the reliable, high-speed transmission of information in digital format between endpoints. This increased use is bringing major changes in network architecture/infrastructure design, in network operations and in the classes of services (e.g., video-on-demand and video teleconferencing) offered to users at the endpoints. In particular, network operation must be efficient in terms of allocating resources (e.g., assets such as capacity in links and buffer space in nodes) in a network among the classes of services (invoked by users at endpoints) competing for network resources. Efficient allocation of network resources can ensure that a network operates at high capacity (i.e., the network accommodates a large amount of information in transit through the network) thereby extracting high amounts of revenue from endpoint users. At the same time, the efficient allocation of resources will also take into account any quality of service commitments (e.g., guaranteed bandwidth or maximum information loss probability) made to endpoint users invoking the classes of services.

One way to increase network efficiency involves sharing network resources. Various techniques for sharing resources have been considered. For example, one technique permits indiscriminate or complete sharing of network resources among various classes of services. Under the complete sharing technique, however, it is possible for one class of service to overwhelm all others, i.e., the one class of service uses all available resources, so that in some sense, the sharing is not fair. In another sharing technique, called complete partitioning, the physical elements that underlie the resources (e.g., the cable that supports a given bandwidth or capacity for carrying information or the memory devices that form the buffers in a node) are partitioned or allocated among the various classes of services, allowing each service exclusive use of its allocated resources. Under the complete partitioning technique, however, unused resources assigned to one class of service may not be used by another class of service and thus efficiency of the network is lowered.

A technique intermediate between the complete partitioning and complete sharing techniques is physical partitioning (PP). In the PP technique, as in the complete partitioning technique, the physical elements that underlie the resource are divided among the classes of services. However, sharing is permitted. Each sublink is then assigned a trunk (or sublink) reservation parameter. Calls of each class have priority in using capacity available within their allocated sublink. A call arriving at the sublink allocated to its class is accepted if the available capacity on the link (equal to the link capacity minus the capacity used by calls in progress through the link) is sufficient to carry the call. If there is not sufficient available capacity, then in accordance with some discipline or criterion, another sublink is chosen for carrying the call. To carry the call, the other chosen sublink must have available capacity which exceeds the sum of the capacity required by the call plus the sublink reservation parameter assigned to the link, i.e., the available capacity must be sufficiently in excess of the reservation parameter to carry the call. The sublink reservation parameter is designed to protect the sublink from having its capacity used by calls from other classes to such a point that calls from the class of service associated with the sublink are blocked or not accepted for routing. If no such other sublink exists, the call is lost. The simplest discipline picks the other sublink at random. Other disciplines for selecting alternate sublinks are based on the network state (which reflects utilization of network resources such as available capacity in links and available buffer space in nodes). See, Martin I. Reiman, "Optimal Trunk Reservation for a Critically Loaded Link." *Teletraffic and Datatraffic*, A. Jensen and V. B. Iverson (eds), Elsevier Science Publisher, North Holland (1991); K. W. Ross, "Multirate Loss Models for Broadband Telecommunication Networks," Springer 1995.

The PP technique is advantageous in that it offers some protection to each class of service (because, unlike the complete sharing technique, calls of each class have an associated sublink at which they receive priority) while at the same time making more efficient use of the resource (because, unlike the complete partitioning technique, it allows some sharing). However, PP techniques have some undesirable characteristics.

To illustrate, consider a situation in which calls of a first class of service dominate usage, not only at a resource assigned or allocated to the first class, but also at a resource assigned to a second class of service. If the resource is capacity in a sublink, the situation may be due to a sudden burst of calls in the first class. In this situation, a call from the second class may be denied access to the resource assigned to the second class. In other words, the amount of available resource in the resource assigned to the second class may be insufficient to accommodate the call from the second class due, in part, to utilization of the resource assigned to the second class by calls from the first class. Moreover, if the call of the second class attempts to use any resources assigned to the first class that may have become available, the available resources must be sufficient not just to accommodate the call of the second class, but to accommodate the call so that the available resources exceed the sublink reservation parameter.

Note, however, that the sublink reservation parameter is a factor only when calls from one class attempt to use resources allocated to calls from another class. In the situation above, if a call of the first class comes in, it will be given priority at the resources assigned to calls of the first class, i e., no sublink reservation parameter is used. Thus, even though calls of the first class dominate resources assigned to calls of the second class, a call from the first class may be accepted and a call of the second class may be blocked or rejected. Thus, the PP technique may accentuate or propagate unfairness in sharing resources.

Thus there is a need for improved techniques for sharing network resources.

SUMMARY

The present invention is directed to the above described types of methods in which a call of a class of service operating in a network requires resources in excess of those allocated to the class and where other resources, beyond those allocated to the class, are advantageously shared with the class of service. However, in accordance with the present invention, the sharing is based on a reservation parameter associated with the class of service of the call. The reservation parameter associated with a particular class represents the amount of the resources in the network that cannot be borrowed by the particular class when the particular class is using resources in excess of those allocated to the particular class. As such, the reservation parameter protects other classes from excessive borrowing by the particular class. The reservation parameter is advantageously a function of the network state.

The reservation parameter can be used to determine if sufficient resources are available so that a particular call associated with a given class of service may be routed through the network on a path comprising nodes and links. A path on which the call can be routed can be determined by identifying those links, and the nodes between them, in the network which have the resources to and are capable of accepting the call. Those links are identified where either: 1) the particular call and other calls in the given class do not require link resources in excess of those allocated to the given class and where the link has sufficient resources to accommodate the call or 2) where the particular call and the other calls in the given class do require link resources in excess of those allocated to the given class and where the given class may share, in accordance with a reservation parameter associated with the given class, link resources allocated to other classes. The identified links may be used to generate a set of paths on which the call may be routed, and a particular path for routing the call is selected based on a criterion.

DETAILED DESCRIPTION

Figure 1:
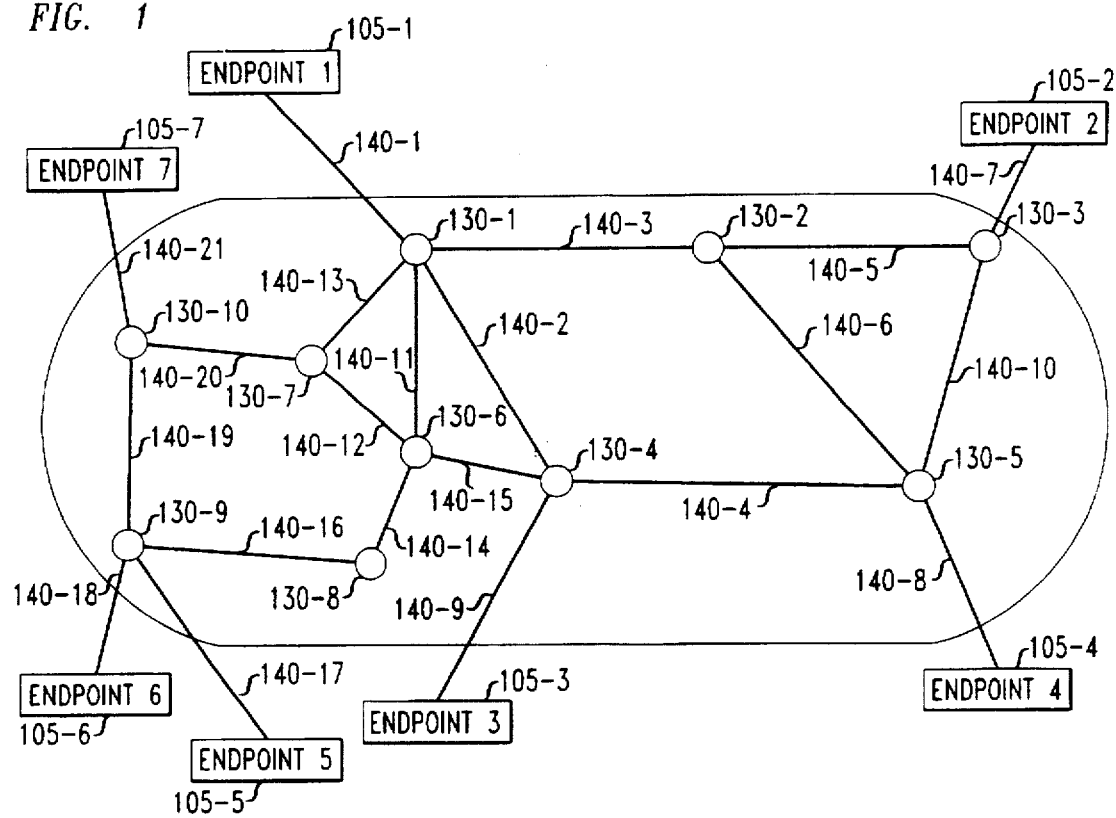
FIG. 1 illustrates a network in which the inventive method may be practiced.

FIG. 1 illustrates a network in which the inventive method for sharing network resources by virtual partitioning may be practiced. Network 110 comprises nodes 130-$j$ and links 140-$n$. Each link has associated with it a respective bandwidth capacity. Information is input to the network from endpoints 105-$m$. When information is to be, exchanged or transferred between endpoints (ie., when a call is made between an initiating endpoint and a destination endpoint), the initiating endpoint makes a request that a path for carrying the call be established in the network between the two endpoints. For example, one possible path over which a call may be carried between endpoints 105-1 and 105-2 comprises nodes 130-1, 130-2 and 103-3 and links 140-1, 140-3, 140-5 and 140-7. Selecting a particular path to carry a call (i.e., routing a call) through the network requires that the nodes and links in the particular path have sufficient available resources.

The inventive method is a technique for sharing network resources fairly and efficiently between classes of services so as to enable paths for carrying calls to be established in a network . In the inventive method a call is assigned to a class according to the type of service the call invokes. The sharing is constrained to be both "fair" and "efficient." In other words, the sharing is such that a given quality of service commitment for each class of call can be achieved (the "fairness" constraint) while at the same time ensuring that one or more network resources are not underused (the "efficiency" constraint). The fairness constraint is reflected in the inventive method in that some resources are allocated to each call class, while the efficiency constraint is reflected in that some sharing of the allocated resources is permitted. The sharing in the inventive method is termed "virtual partitioning" because, unlike physical partitioning, no particular physical elements that provide the basis for the resources are dedicated or specifically associated with any class.

In the inventive method nominal amounts of one or more resources are allocated to each call class, advantageously in such a way that a given quality of service requirement can be achieved. Resources are shared as a function of the network state (i.e., as a function of the current utilization of the one or more network resources by the various classes). The network state is reflected in a varying (or dynamic) reservation parameter for each class. That is, instead of each class of traffic having a fixed priority or reservation parameter, as in traditional trunk reservation schemes, the priorities depend on the state of the system and thus will vary with changes in the numbers of calls of each class. The role of the reservation parameter is to protect underloaded classes (ie., those classes not using of all their allocated nominal capacity) from excessive borrowing by overloaded classes (i.e., classes using more than their allocated nominal capacity). More generally, the inventive method may be used to determine if sufficient resources are available for routing calls and to route calls based on the determined available resources.

Figure 2:
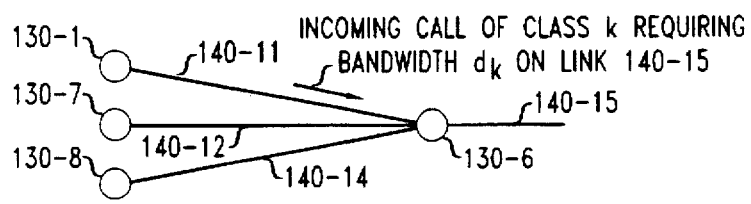
FIG. 2 illustrates a portion of the network of FIG. 1.

Use of the inventive method is demonstrated below in the portion of network 110 of FIG. 1 shown in FIG. 2. The inventive method is illustrated herein where the network resource to be shared is capacity on one or more links. However, those skilled in the art will recognize the applicability of the inventive method to resources other than capacity. More specifically, the inventive method is illustrated where calls in K classes of service arrive from links 140-11, 140-12 and 140-14 at node 130-6 for subsequent transmission on link 140-15. Link 140-15 has capacity C. Each class of call is allocated a nominal capacity $C_k$ where $$\sum_k C_k \geq C$$

and $C_k$ is sufficiently high to meet any quality of service guarantees for the $k^{th}$ service. The nominal capacities may advantageously be assigned using techniques described in A. Elwalid, D. Mitra and R. H. Wentworth, "A New Approach for Allocating Buffers and Bandwidth to Heterogeneous Regulated Traffic in an ATM Network," IEEE *J Sel. Areas Comm.*, Vol. 13, No. 6, pp. 1115–1127, August 1995; application Ser. No. 08/554502, filed Nov. 7, 1995, entitled "Method for Logical Network Design in Multi-Service Networks," by D. Mitra, J. Morrison and K. Ramakrishnan, incorporated by reference herein. Let $n_k$ denote the number of calls of class k in progress on link 140-15. Let $d_k$ be the bandwidth required for a call of class k on link 140-15. The variable $d_k$ may advantageously represent an effective bandwidth for a call of class k reflecting characteristics of the class such as burstiness and variability as well as quality of service requirements. Elwalid, supra.

The arrival process of calls of class k, k=1,2, ... K, is advantageously assumed to be a Poisson process (useful in describing many chance phenomena) where the arrival process is completely characterized by a rate parameter, $\lambda_k$. Calls of class k advantageously have exponential holding times with respective means for each class.

Figure 3:
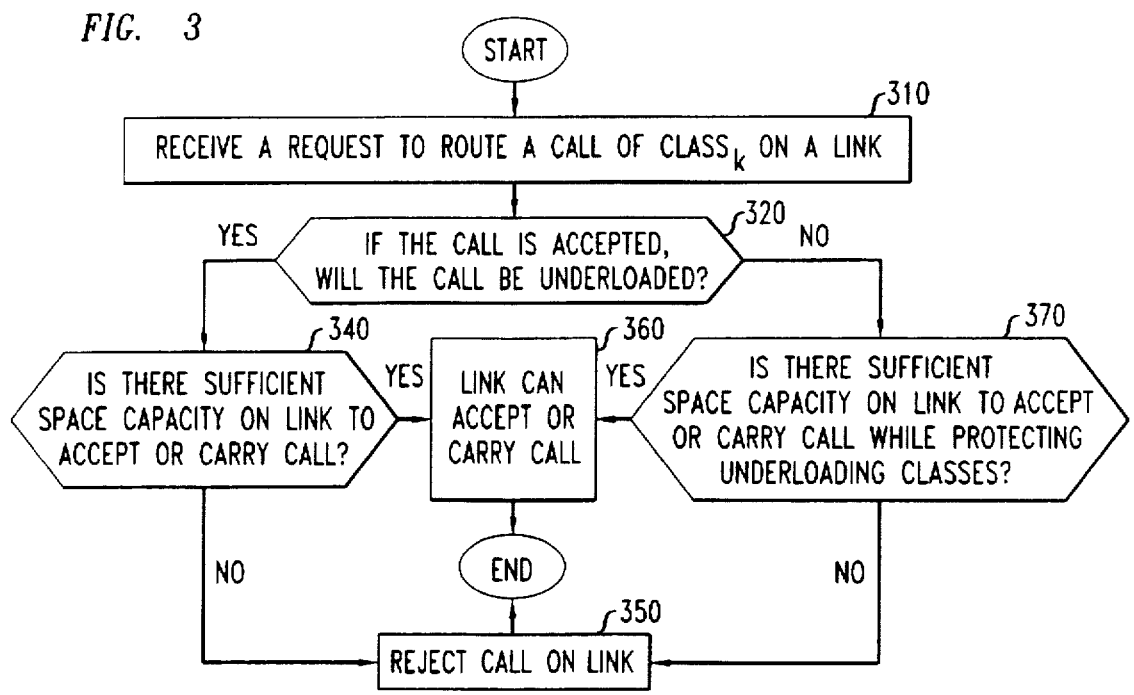
FIG. 3 is a flowchart of steps in the inventive method for determining whether a link may accept or reject a request to route a call.

FIG. 3 illustrates the steps in the inventive method. In step 310 a request is received (e.g., by node 130-6) to route a call of class k requiring bandwidth $d_k$ onto a link (e.g., link 140-15) of capacity C. In step 320 the inventive method determines whether, if the call of class k is accepted, if class k will be "underloaded" or "overloaded." Class k will be underloaded if the number of calls of that class in progress through the link ($n_k$) plus the requested call have not used up all the capacity allocated to class k. The capacity used by the $n_k$ calls can be determined from knowledge of the number of calls in progress of the class $n_k$ and from knowledge of the bandwidth used by the individual calls. Alternatively, the capacity used can be determined by assuming that each call in class k requires bandwidth $d_k$. In this case, class k will be underloaded if $n_k d_k \leq C_k - d_k$. Still further, $n_k d_k$ may be obtained by a process of direct measurements. The measurement process requires appropriate smoothing and averaging (over a small time interval) by techniques well known in the art. Class k will be overloaded if and only if the currently routed calls plus the requested call will use up all the nominal capacity allocated to class k. Again, if the bandwidth of each call in class k is assumed to be $d_k$, class k will be overloaded if $n_k d_k > C_k - d_k$. There are two cases to be considered. In the first case, if the call is accepted on the link, class k is underloaded, and the "yes" branch of the decision box in step 320 is taken. Alternatively, in the second case, class k is overloaded if the call is accepted, and the "no" branch of the decision box in step 320 is taken.

If the "yes" branch is taken, the inventive method next determines in step 340 if there is sufficient available capacity on the link to accept the call. In other words, the call can be accepted (step 360) if $n \leq C - d_k$, where n denotes the amount of bandwidth already being used on the link by previously routed calls, e.g., $$n = \sum_{j=1}^{K} n_j d_j.$$

If there is insufficient available capacity on the link, the call will be rejected in step 350.

If the "no" branch is taken from the decision box in step 320, the inventive method then determines (step 370) if there is sufficient available capacity on the link to accept the call while protecting underloaded classes of calls. In other words, the call can be accepted on the link (step 360) if $n \leq C - r_k - d_k$, where n is as defined above and where $r_k$ denotes the reservation parameter which is applied to class k calls when class k is overloaded. The selection of $r_k$ is discussed in more detail below. If the available capacity is insufficient to protect underloaded classes, the call is rejected (step 350).

The above inventive method may equivalently be stated in the following more compact form:

accept a new call of class k if and only if: $n \leq C - r_k 1$ ($n_k d_k > C_k - d_k$)–$d_k$ Here 1(x) is the indicator function which has value 1 if x is true and value 0 if x is false.

As noted above, $r_k$ denotes the reservation parameter which is applied to class k calls when class k is overloaded. The role of the reservation parameter is to protect the underloaded classes. Reservation works thus: when any underloaded class becomes active and demands resources up to its nominal allocation, the reservation mechanism ensures that resources are made available in a timely manner. The specific value of $r_k$ is chosen so as to permit a large number of calls to be accepted while ensuring that calls in no class of service are blocked or rejected above a tolerable level. The choice of the numerical value of the reservation parameter is advantageously a monotonic increasing function in the amount of underloadedness. The selection of $r_k$ is discussed below.

Consider $$\sum_{k \in U} (C_k - n_k d_k)$$

to be representative of the degree of underloadedness in the link where U denotes the set of underloaded classes. Hence, let $$r_k = f\left[ \sum_{k \in U} (C_k - n_k d_k); \lambda_k; \mu_k; d_k \right]$$

where $f[ \ ]$ is advantageously a slowly changing and montonically increasing function of the first argument of function $f$, such as $\log[ \ ]$. The reservation parameter $r_k$ also advantageously depends on the rate of the arrival process of class k calls, $\lambda_k$, increasing with increasing $\lambda_k$ on the mean holding time, $1/\mu_k$, increasing with increasing $1/\mu_k$, and on the bandwidth required by class k calls, $d_k$, increasing with increasing $d_k$. The reservation parameter $r_k$ is, typically in the range of 2 to 5% of the value of C. Another option is to have three values for $r_k$:

$r_k = r_{k,1}$ if $$\sum_{k \in U} (C_k - n_k d_k)$$

is large $r_k = r_{k,2}$ if $$\sum_{k \in U} (C_k - n_k d_k)$$

is moderate $r_k = r_{k,3}$ if $$\sum_{k \in U} (C_k - n_k d_k)$$

is small where $r_{k,1} > r_{k,2} > r_{k,3}$. For example, $r_{k,1}$, $r_{k,2}$ and $r_{k,3}$ can be fixed values.

Figure 4:
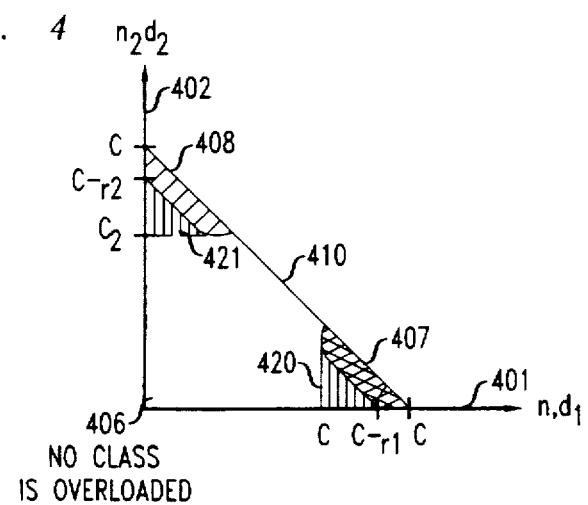
FIG. 4 is a graph illustrating the dependence of call priorities with the state of the network.

FIG. 4 may be used to illustrate the aspect of dynamic priorities, ie., of a state dependent reservation parameter, in the inventive method. In particular, FIG. 4 illustrates priority regions for a case where calls are of one of two classes, k=1 or k=2, having respective nominal capacities $C_1$ and $C_2$ and respective reservation parameters $r_1$ and $r_2$. Calls in each class are carried on a link of capacity C. Axis 401 represents the amount of bandwidth used by $n_1$ calls of bandwidth $d_1$ in class 1 through the link of capacity C. Axis 402 represents the amount of bandwidth used by $n_2$ calls of bandwidth $d_2$ in class 2 through the link of capacity C. Since the link has capacity C, the total bandwidth used by the calls in each class cannot exceed C, i.e., the number of calls of class 1 and class 2 must satisfy the condition $n_1 d_1 + n_2 d_2 \leq C$. Values of $n_1 d_1$ and $n_2 d_2$ which satisfy this condition are represented by points in the region formed by line 410 and axes 401 and 402. The region comprises five areas: 406, 407, 408, 420 and 421.

Area 406 represents values of $n_1 d_1$ and $n_2 d_2$ where neither class is overloaded and thus no call class is given priority. Area 407 represents values of $n_1 d_1$ for which class 1 is overloaded and where, therefore, a reservation parameter is used to protect calls of class 2 from being blocked. The reservation parameter plays a role when calls of class 1 arrive. Since class 1 is overloaded, the class will have to borrow or share resources (e.g., the nominal allocated capacity) associated with class 2. The sharing will only be allowed if resources beyond those reserved by the reservation parameter are available on the link to carry the call. The method ensures that sufficient spare capacity remains for calls of class 2 (the underloaded class) to be accommodated, rather than blocked or rejected, on the link. Thus, the amount of protection given to class 2 calls, and hence the size of area 407, will depend on the reservation parameter. Similarly, area 408 is the region in which class 2 is overloaded and where a reservation parameter is used to protect class 1 calls. Area 420 represents values of $n_1 d_1$ where class 1 is overloaded but where no priority is given to class 2 calls. The size of area 420 depends on $r_1$. The value of $r_1$ is advantageously selected to be sufficiently high so as to provide protection to underloaded classes but not so high as to cause the inventive method to be overly conservative in blocking class 1 calls (i.e., to be overly conservative in borrowing resources from other classes) when class 1 is overloaded. Similarly, area 421 represents values of $n_2 d_2$ where class 2 is overloaded but where no priority is given to class 2 calls. Thus, depending on the state of how resources are used in the link, i. e., on the value of $n_1 d_1$ and $n_2 d_2$, the priority given to a class of call can be determined. Moreover, the priority given to a class of call may vary as $n_1$ and $n_2$ change.

The above technique, which focused on determining whether a single link can accept or reject a call, can be applied to all links in a network so as to select a path on which to route a call between two endpoints. Consider again network 110 of FIG. 1. Network 110 is a distributed or decentralized network in that routing decisions are made locally. Each node 130-$j$ in network 110 periodically exchanges state information (i.e., information relating to network topology and the allocation and usage of network resources) with neighboring nodes. The state information thus reflects the amount of network resources available or in use on a link from a node to every neighboring node. Hence, paths through the network capable of carrying a call may be determined. Note, however, that unless the state information propagates quickly relative to the speed with which calls are initiated and terminated, the information will become dated. Thus, each node may have a different description or local view of the network state. This description is called the local network state.

Figure 5:
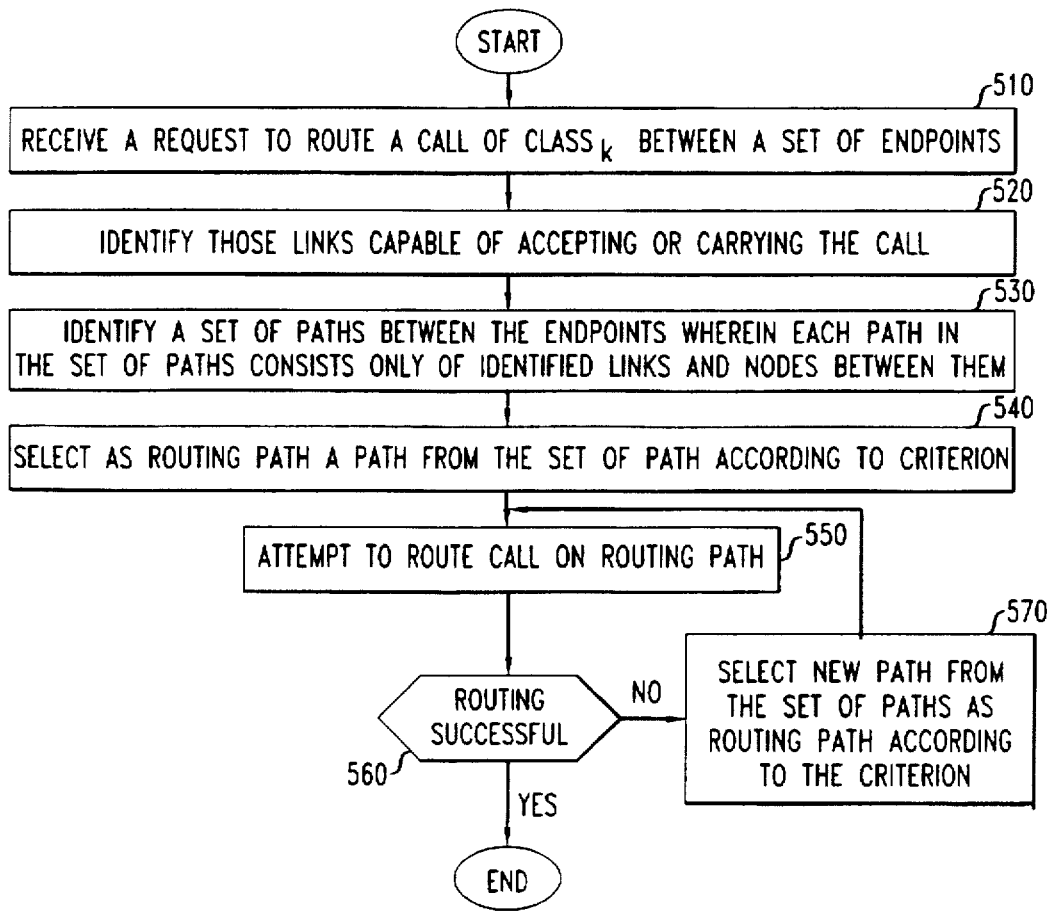
FIG. 5 is a flowchart of steps for routing a call through a distributed network using the inventive method.

FIG. 5 illustrates steps for using the inventive method to select a path through a network on which a call may be routed. In step 510 a request to route a call of class k on a path through the network between a set of endpoints, comprising an initiating endpoint and a destination endpoint, is received (e.g., by the node directly connected to the initiating endpoint). In step 520, those links in the network capable of accepting or carrying the call of class k are identified. Step 520 may be executed using the steps in the inventive method as shown in FIG. 3 where the determination of overloadedness or underloadedness and of whether sufficient available capacity exists is made based on the local network state. In step 530, the method identifies a set of paths between the set of endpoints wherein each path in the set of paths consists only of identified links and the nodes between the identified links. In step 540, a path is selected from among paths in the set according to a criterion as the routing path for the call. An attempt is made to route the call on the selected path in step 550.

In step 560 the method checks to see if the routing was successful. If it was, the method ends. If it was not successful, another path is selected (step 570) and step 550 is repeated. An attempt at routing may not be successful because the information at the node may have used dated information to identify links capable of accepting or carrying the call. Thus, resources that the node expected to be available may not indeed be available, in which case the routing attempt will be unsuccessful.

The criterion for selecting a path may be chosen for ease of implementation (e.g., the selection of a path from the set of paths may be at random). In other cases, the criterion for selecting a path may be chosen so as enhance network operation with respect to one or more resources. For example, in the method of FIG. 3, if it is determined that a link can accept a call, a "cost" for accepting the call can be assigned to the link. The cost could reflect the extent to which the class is either overloaded or close to being overloaded, ie., the higher the extent of overloading or the closer to being overloaded, the higher the cost. The selection of a path could then be a function of the cost, as for example, by selecting the path whose links sum to the lowest cost.

Figure 6:
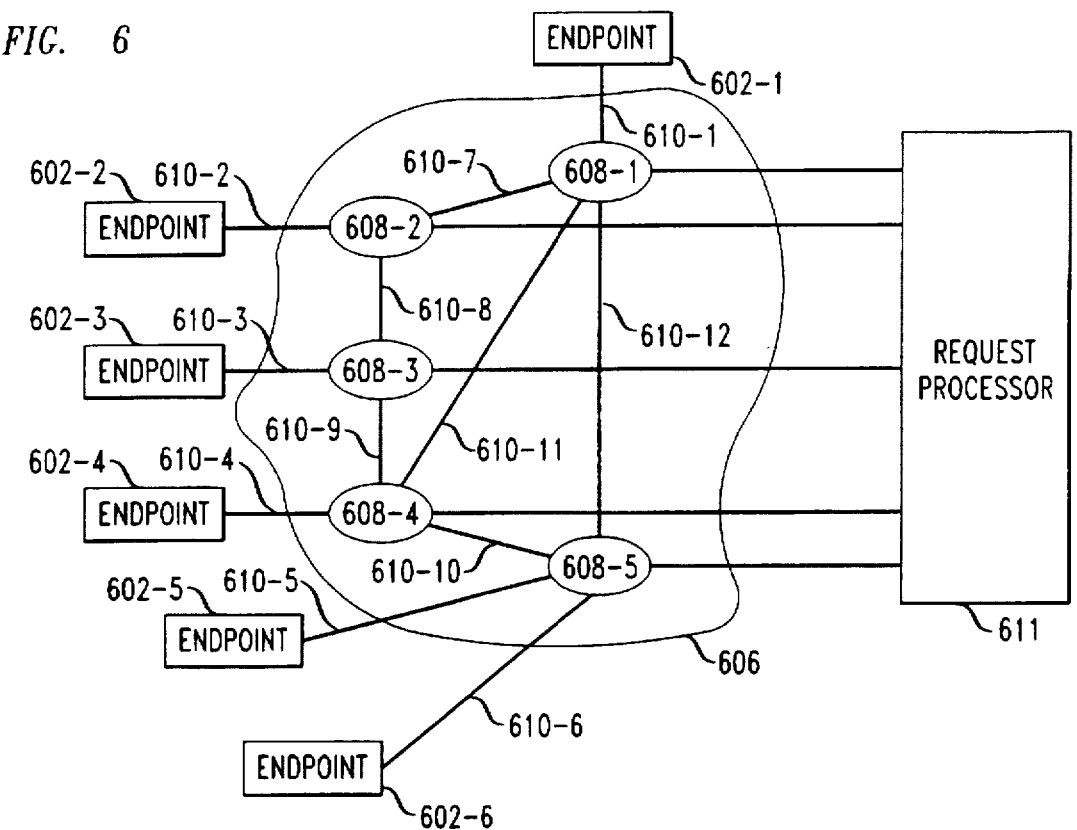
FIG. 6 illustrates a centralized network in which the inventive method may be practiced.

The inventive method may also be used in networks in which centralized routing decisions, rather than distributed or decentralized routing decisions, are made. FIG. 6 illustrates the structure of network 606 which is a centralized routing system in which the inventive method may be practiced. Endpoints 602-$i$ exchange or transfer information via network 606. Network 606 comprises nodes 608-$p$ and links 610-$l$. Links 610-$l$ connect nodes 608-$p$ to each other and to endpoints 602-$i$. Request processor 611 is connected to nodes 608-$p$ and may be located within network 606.

Since all requests to route calls are processed in request processor 611, request processor 611 has up-to-date knowledge of the network state. Thus, multiple attempts to select a path on which to route a call typically will not be necessary.

Centralized routing systems are advantageous in that routing decisions are made with up-to-date state information. However, a centralized routing system is more likely to suffer from reliability problems than a decentralized system since a centralized routing system has a single point of failure (i.e., the request processor). Moreover, centralized routing systems typically have difficulty operating or communicating with other centralized routing systems since each of the systems typically will not have information about the state of the other system. Thus, additional protocols for arbitrating and communicating between centralized networks are required. Finally, since each node in centralized routing system must first communicate with a device (such as a request processor), the propagation delay for communicating with such a device increases the time for establishing a call beyond the time required by a distributed system thereby increasing system overhead per call.

Figure 7:
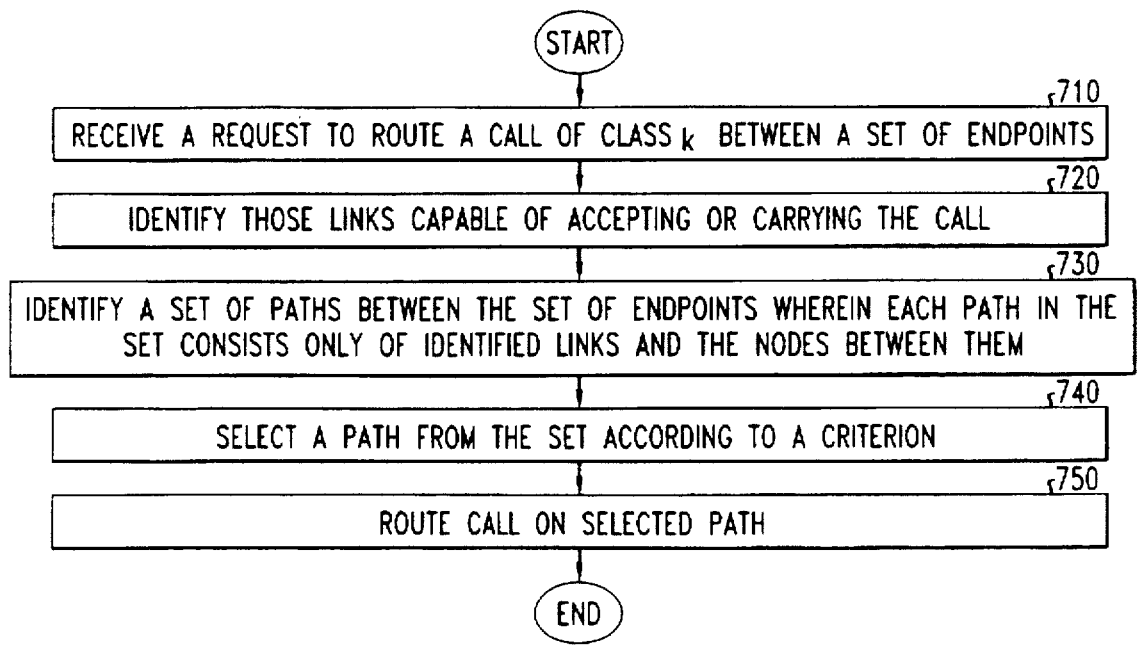
FIG. 7 is a flowchart of steps for routing a call through a centralized network using the inventive method.

Steps in the inventive method as used in the centralized routing system of FIG. 6 are shown in FIG. 7. In step 710 request processor 611 receives a request to route a call of class k on a path through the network between a set of endpoints comprising an initiating endpoint and a destination endpoint. In step 720, those links in the network capable of carrying the call of class k are identified. Step 720 may be executed using the steps in the inventive method as shown in FIG. 3 where the determination of overloadedness/ underloadedness and sufficient spare capacity is made based on the up-to-date network state information in request processor 611. In step 730, a set of paths between the set of endpoints is identified wherein each path in the set of paths consists only of identified links and the nodes between the identified links. In step 740, a path is selected, according to a criterion, from among paths in the set on which to route the call (step 750). Since all the links in the selected path capable of accepting the call were identified using up-to-date state information, the routing of step 750 should be successful. The criterion for selecting a path may be chosen, as above in the case of distributed routing, for ease of implementation or so as to enhance network operation with respect to one or more resources.

The inventive method may also be used for sharing resources at different levels in a hierarchical network. In particular a hierarchical virtual partitioning method advantageously uses a reservation parameter at each level in the hierarchy to ensure fair and efficient sharing of resources at each level. The hierarchical virtual partitioning method is illustrated in the context of a virtual private network (VPN). A private network is a network for the exclusive use of one customer. Such a network can be global in scope and typically serves a large corporate customer or a government agency. A virtual private network (VPN) is a network shared by a set of customers wherein each customer is typically guaranteed services with quality comparable or better than what would be achieved with individual private networks, but at lower cost. For example, assume that customer j, j=1,2, . . . , in a set of VPN customers uses various service classes k. The class or service k of customer j (also called superclass j) is denoted class (j,k), k=1,2, . . . , $I_j$. In the context of the invention, the VPN is implemented by hierarchical virtual partitioning with a two level hierarchy. Each call in class (j,k) has associated individual characteristics, such as bandwidth required per call, call arrival rate and mean call holding time.

As above, the inventive method may be used to determine which links are capable of accepting a call and to determine paths through the shared network for routing calls, e.g., the method may be used to determine whether a link of capacity C can accept a call of class (j,k) in a VPN. Let $C_j$ be the nominal capacity allocated to customer j, and let $C_{j,k}$ be the nominal capacity allocated to class (j,k). Typically, due to the advantage of statistical multiplexing (i.e., where, by assuming that information arrives at an outgoing link independently from incoming links, that unutilized time varying portions of resources allocated to classes in the network can be used)

$C_1+C_2+\ldots \geq C$ $C_{j,1}+C_{j,2}+\ldots +C_{j,I_j} \geq C_j$

Figure 8:
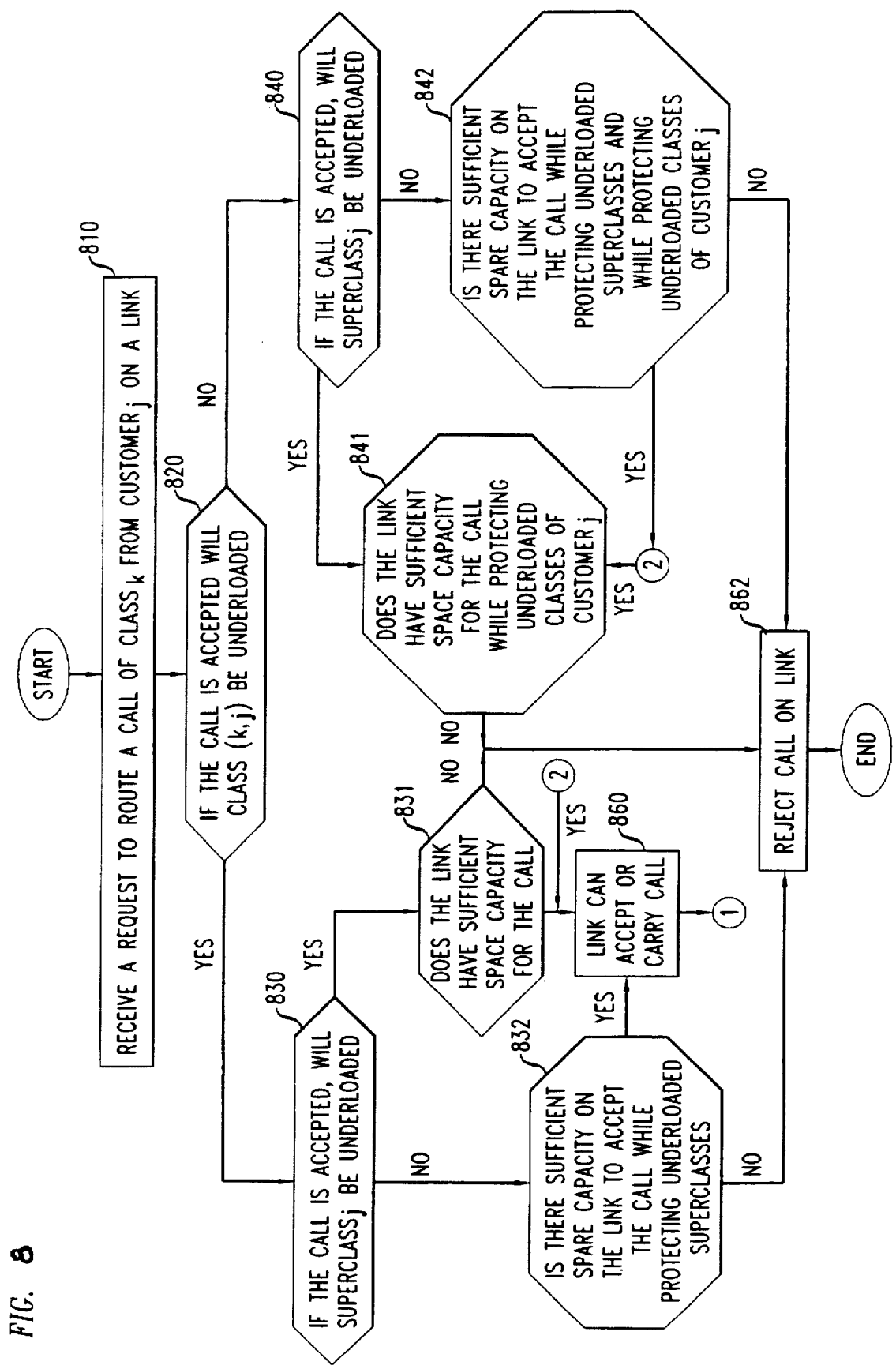
FIG. 8 is a flowchart of step in the inventive method for determining whether a link may accept or reject a request to route a call in a virtual private network.

Further, let $n_{j,k}$ be the number of calls of class (j,k). The parameter $n_j$ will be used to denote the bandwidth occupied by calls from superclass j. Note that $n_j$ can be obtained from knowledge of the number of calls in progress of various classes in superclass j and from knowledge of the bandwidth used by individual calls of those classes. Alternatively, $n_j$ may be obtained from direct measurements and appropriate smoothing or averaging (over a small prior time interval) by techniques well known in the art. The parameter n will be used to denote the bandwidth occupied by calls of all classes from all customers. Also, let $d_{j,k}$ be the bandwidth requirement for a call of class (j,k). Finally, let $R_j$=reservation parameter for superclass j $r_{j,k}$=reservation parameter for class k of superclass j FIG. 8 illustrates steps in the inventive method as used in a VPN. In step 810 a request is received to route a call of class k from customer j. In step 820, the inventive method determines, if the call is accepted, whether class (j,k) will be underloaded, i.e., assuming all calls of class k require bandwidth $d_k$ whether $n_{j,k}d_{j,k} \leq C_{j,k}-d_{j,k}$.

If the class is underloaded, the "yes" branch of the decision box in step 820 is taken to step 830. Step 830 is a decision step in which the inventive method determines, if the call is accepted, whether superclass j will be underloaded, i.e., whether $n_j \leq C_j-d_{j,k}$. Depending on the determination, either step 831 or step 832 is executed.

In step 831, the superclass j will be underloaded and it is determined whether the link has sufficient available capacity for the call. If sufficient available capacity exists (i e., if $n \leq C-d_{j,k}$), the link can accept the call (step 860). Otherwise, the link will reject the call (step 862). In step 832, the superclass j will be overloaded. However, if there is sufficient available capacity from other superclasses (i.e., if the resources from other classes can be shared) then the call may still be accepted provided the call does not borrow or want to share too much capacity from the other superclasses. The reservation parameter $R_j$ protects underloaded superclasses. Thus step 832 determines if $n \leq C-R_j-d_{j,k}$ and executes either step 860 or 862.

Returning to step 820, if class (j,k) will be overloaded if the call is accepted, the "no" branch of step 820 is taken to step 840. Step 840 is also a decision step in which the inventive method determines (as in step 830), if the call is accepted, whether superclass j will be underloaded. Depending on the determination, either step 841 or step 842 is executed. In step 841 superclass j will be underloaded and class (j,k) is overloaded. The inventive method then determines whether there is sufficient available capacity to accept the call while protecting underloaded classes of customer j. In other words, the call is accepted if $n \leq C-r_{j,k}-d_{j,k}$. The parameter $r_{j,k}$ has the role of protecting all underloaded classes in superclass j from excessive usage by the class k when the class is overloaded. If available capacity exits, the link can accept the call (step 860). Otherwise the link will reject the call (step 862). In step 842 superclass j will be overloaded as is class (j,k), and the inventive method determines if there is sufficient available capacity to accept the call while protecting underloaded superclasses and the underloaded classes of customer j. In short, step 842 determines if $n \leq C - r_{j,k} - R_j - d_{j,k}$. Either step 860 or step 862 (ie., either accepting or rejecting the call on the link) is executed accordingly.

Thus, in focusing on class (j,k) there are four cases to be considered, depending upon whether the class k and the superclass j are underloaded or overloaded, in deciding whether newly arriving call of class (j,k) can be accepted on the link. The table below summarizes these classes:

| Overload/Underload Status | Related Step in FIG. 8 | Condition for Accepting Call on Link |
|---|---|---|
| class (j,k) is underloaded and superclass j is underloaded | 831 | accept call if and only if: $n \leq C - d_{j,k}$ |
| class (j,k) is underloaded and superclass j is overloaded | 832 | accept call if and only if: $n \leq C - R_j - d_{j,k}$ |
| class (j,k) is overloaded and superclass j is underloaded | 841 | accept call if and only if: $n \leq C - r_{j,k} - d_{j,k}$ |
| class (j,k) is overloaded and superclass j is overloaded | 842 | accept call if and only if: $n \leq C - r_{j,k} - R_j - d_{j,k}$ |

A compact equivalent statement of the condition under which a link is capable of accepting or carrying a call is: accept a new call of class (j,k) if and only if $$n \leq C - r_{j,k} 1(n_{j,k} d_{j,k} > C_{j,k} - d_{j,k}) - R_j 1(n_j > C_j - d_{j,k}) - d_{j,k}$$

Recall $R_j$ is the reservation parameter whose role is to protect all underloaded customers from excessive use by customer j. Similarly, $r_{j,k}$ has the role of protecting all underloaded classes in superclass j from excessive usage by the class k when the latter is overloaded.

As above, parameter $R_j$ in general is allowed to depend on the usage by all the superclasses, i.e., all $\{n_i\}$, and also on the aggregate parameters of superclass j, $R_j = f_j\{n_1 n_2, \ldots n_j\}$. However, as discussed earlier, in the interest of ease of implementation, simpler options may be considered. For example, an option is to have three values:

$R_j = R_{j,1}$ if $$\sum_{i \in U} (C_i - n_i)$$

is large $R_j = R_{j,2}$ if $$\sum_{i \in U} (C_i - n_i)$$

is moderate $R_j = R_{j,3}$ if $$\sum_{i \in U} (C_i - n_i)$$

is small
where $R_{j,1} > R_{j,2} > R_{j,3}$ and $R_{j,1}$, $R_{j,2}$ and $R_{j,3}$ are fixed values. Here, U denotes the set of underloaded superclasses. Another option is to have $R_j$ take a constant value independent of the degree of underloadedness.

The considerations related to the choice of the parameter $r_{j,k}$ are as before. That is, in general, $$r_{j,k} = f_{j,k}(n_{j,1}, n_{j,2}, \ldots, n_{j,1}; \lambda_{j,k}, \mu_{j,k}; d_{j,k})$$

Note that advantageously there is no dependence on usage by classes other than those in the same superclass. A simpler option is to have three possible values:

$r_{j,k} = r_{jk,1}$ if $$\sum_{i \in U_j} (C_{j,1} - n_{j,1} d_{j,1})$$

is large $r_{j,k} = r_{jk,2}$ if $$\sum_{i \in U_j} (C_{j,1} - n_{j,1} d_{j,1})$$

is moderate $r_{j,k} = r_{jk,3}$ if $$\sum_{i \in U_j} (C_{j,1} - n_{j,1} d_{j,1})$$

is small where $r_{jk,1} > r_{jk,2} > r_{jk,3}$. Here $U_j$ denotes the set of underloaded classes in superclass j. A final option is to have $r_{j,k}$ take a constant value.

Note that path for routing the call through a distributed or centralized VPN can be determined using the inventive method of FIGS. 5 and 7, respectively, where steps 530 and 730 are advantageously implemented using the method illustrated in FIG. 8.

This detailed description discloses a method for resource sharing by virtual partitioning. Although the inventive method has been described in the context of virtual partitioning of resources, such as bandwidth or capacity, in a network, those skilled in the art will recognize the applicability of the inventive method to other contexts. For example, other network resources, such as buffer space in nodes, may be shared according to the inventive method. It should also be noted that the inventive method may be applied to a variety of types of networks including circuit switched and packet switched networks.

The inventive method disclosed herein has been described without reference to specific hardware or software. Instead, the inventive method has been described in such a manner that those skilled in the are can readily adapt such hardware and software as may be available or preferable.

What is claimed is:

1. A method of operating a network by sharing resources associated with said network, wherein:
   (a) each of plural classes of service is allocated a respective portion of said resources;
   (b) a particular class of service operating in the network requires a greater portion of said resources than its allocated portion; the method comprising:
      (i) receiving a request to accept a call associated with said particular class of service;
      (ii) applying a criterion for acceptance of the call, wherein: said criterion invokes a respective reservation parameter specifically assigned to said particular class of service; and the reservation parameter represents a quantity of network resources that is excluded from sharing by said particular class or service; and
      (iii) accepting the call only if the criterion is satisfied, thereby permitting said particular class of service to share network resources exceeding its allocated portion; and (c) a different reservation parameter is assigned to each of said plural classes of service.

2. The method of claim 1 wherein said network is characterized by a network state and wherein said reservation parameter associated with said particular class of service is a function of said network state.

3. The method of claim 2 wherein said resources comprise capacity in a link in said network, wherein the capacity is shared by a set of calls, wherein each call in said set of calls is associated with a class of service in said plurality of classes of service, and wherein said network state characterizes the number of calls associated with each class of service in said plurality of classes of service.

4. The method of claim 2 wherein said reservation parameter is also a function of an arrival rate process for calls associated with said particular class of service.

5. The method of claim 2 wherein said reservation parameter is also a function of a mean holding time for calls associated with said particular class of service.

6. The method of claim 1 further comprising the step of: routing said call on a path through said network.

7. The method of claim 6 wherein said network is a centralized network.

8. The method of claim 6 wherein said network is a distributed network, said method further comprising the step of:
if said step of routing is unsuccessful, routing said call on another path.

9. The method of claim 1 wherein said respective portion of said resources allocated to each class of service is sufficient to satisfy a quality of service requirement associated with said each class of service.

10. A method of operating a network by routing a call on a path through said network, wherein said call is associated with a particular class of service, said network comprising links having associated resources, wherein said particular class of service is allocated a particular respective amount of the resources associated with each link, and wherein said call requires a given amount of the associated resources, said method comprising the steps of:

receiving a request to route said call through said network, identifying a set of links capable of accepting said call requiring said given amount of associated resources, wherein a link in the identified set of links is such that either: 1) said particular class of service is not overloaded and said link has sufficient associated resources to accommodate said call, or 2) said particular class of service is overloaded and said particular class of service may share, in accordance with a reservation parameter associated with said particular class, resources associated with said link allocated to other classes of service, identifying a set of paths on which said call may be routed, wherein each path in said set of paths comprises links in the identified set of links, selecting a path from said set of paths according to a criterion, and routing said call on said selected path.

11. The method of claim 10 wherein said reservation parameter represents an amount of resources associated with said network that cannot be shared by said particular class of service when said particular class of service is overloaded.

12. The method of claim 10 wherein said network is characterized by a network state and wherein said reservation parameter associated with said particular class is a function of said network state.

13. The method of claim 12 wherein said reservation parameter is also a function of an arrival rate process for calls associated with said particular class of service.

14. The method of claim 12 wherein said reservation parameter is also a function of a mean holding time for calls associated with said particular class of service.

15. The method of claim 10 wherein said network is a centralized network.

16. The method of claim 10 wherein said network is a distributed network, said method further comprising the steps of:

if said step of routing is unsuccessful, selecting another path from said set of paths according to said criterion and routing said call on said another selected path.

17. The method of claim 10 wherein said particular class of service is one class of service in a plurality of classes of service and wherein said network state characterizes the number of calls associated with each class of service in said plurality of classes of service.

18. The method of claim 10 wherein the particular respective amount of the resources associated with each link allocated to said particular class of service is sufficient to satisfy a quality of service requirement associated with said particular class.

19. A method of operating a network by sharing resources associated with said network, wherein:

(a) the network is a hierarchical network having plural levels;

(b) associated with each said level are plural classes;

(c) each of said plural classes is allocated a respective portion of said resources; and (d) a particular class or a particular level requires a greater portion of said resources than its allocated portion; such that said level is allocated the total of the respective portions allocated to its associated classes; the method comprising:

(i) receiving a request to accept a call associated with a particular level;

(ii) applying a criterion for acceptance of the call; and (iii) accepting the call only if the criterion is satisfied, thereby permitting said particular class or said particular level to share network resources exceeding its allocated portion, wherein:

(A) said criterion invokes a reservation parameter specifically associated with said particular class or said particular level; and (B) the reservation parameter represents a quantity of network resources that is excluded from sharing by said particular class or said particular level.

20. The method of claim 19 wherein said hierarchical network is characterized by a network state and wherein said reservation parameter associated with said particular level and said reservation parameter associated with said particular class associated with said particular level are each a function of said network state.

* * * * *